United States Patent
Diab et al.

(10) Patent No.: US 7,478,251 B1
(45) Date of Patent: Jan. 13, 2009

(54) METHODS AND APPARATUS FOR PROVISIONING UNINTERRUPTIBLE POWER FOR POWER OVER ETHERNET APPLICATIONS

(75) Inventors: Wael William Diab, San Francisco, CA (US); Matthew A. Laherty, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 717 days.

(21) Appl. No.: 11/021,151

(22) Filed: Dec. 23, 2004

(51) Int. Cl.
*G08B 23/00* (2006.01)
(52) U.S. Cl. .................. 713/300; 713/310; 713/320; 713/321; 713/322; 713/323; 713/324; 713/330; 713/340; 340/693.2; 307/38; 714/14
(58) Field of Classification Search ............ 713/300, 713/310, 320–324, 330, 340; 340/693.2; 307/38; 714/14
See application file for complete search history.

(56) References Cited

U.S. PATENT DOCUMENTS

| | | | |
|---|---|---|---|
| 5,155,842 A * | 10/1992 | Rubin ..................... | 714/22 |
| 5,221,862 A * | 6/1993 | Fiorina et al. ............ | 307/66 |
| 5,381,554 A * | 1/1995 | Langer et al. ............ | 714/14 |
| 5,550,917 A | 8/1996 | Tallec ..................... | 379/442 |
| 5,625,621 A | 4/1997 | Christensen et al. ...... | 370/248 |
| 5,642,052 A | 6/1997 | Earle ..................... | 324/556 |
| 5,670,937 A | 9/1997 | Right et al. ............. | 340/506 |
| 5,680,397 A | 10/1997 | Christensen et al. ...... | 370/421 |
| 5,784,237 A | 7/1998 | Velez ..................... | 361/62 |
| 5,912,963 A | 6/1999 | Begeja et al. ............ | 379/221 |
| 5,936,442 A | 8/1999 | Liu et al. ................ | 327/142 |
| 6,040,969 A | 3/2000 | Winch et al. ............. | 361/82 |

(Continued)

FOREIGN PATENT DOCUMENTS

EP 0 777 357 A2 4/1997

(Continued)

OTHER PUBLICATIONS

Galit Mendelson, "Installing an IP Telephony Network Using Power over LAN", Online, (Nov. 3, 2002) pp. 1-10, XP002340946 Inet, Retrieved from the Internet: URL: http://www.powerdsine.com/Documentation/WhitePapers/Installing_IP_Telephony_network_with _PoL.pdf> retrieved on Aug. 16, 2005, p. 7, line 16-line 19.

(Continued)

*Primary Examiner*—Abdelmoniem Elamin
(74) *Attorney, Agent, or Firm*—BainwoodHuang

(57) ABSTRACT

A controller in PSE (Power Sourcing Equipment) controls how to provision uninterruptible power through corresponding ports (and cables) of the PSE to network devices. For example, the controller of the PSE receives a signal indicating a transition of powering the PSE from a primary power input to a backup power supply. The backup power supply has a limited ability to provide backup power to the PSE. In response to receiving the signal, the controller of the PSE utilizes a powering/de-powering algorithm to generate control information used by the controller to selectively discontinue providing power through the certain ports to respective network devices. Consequently, the PSE and, more specifically, the controller provisions power from the PSE depending on a priority level associated with network devices, extending the power life of critical powered network devices and more efficiently using the backup power supply in the case of a power failure.

24 Claims, 6 Drawing Sheets

U.S. PATENT DOCUMENTS

| | | | |
|---|---|---|---|
| 6,098,174 A | 8/2000 | Baron et al. | 713/300 |
| 6,233,235 B1 | 5/2001 | Burke et al. | 370/356 |
| 6,317,839 B1 | 11/2001 | Wells | 713/320 |
| 6,345,047 B1 | 2/2002 | Regnier | 370/352 |
| 6,357,011 B2 | 3/2002 | Gilbert | 713/300 |
| 6,473,608 B1 | 10/2002 | Lehr et al. | 455/402 |
| 6,483,318 B1 * | 11/2002 | White et al. | 324/539 |
| 6,546,494 B1 | 4/2003 | Jackson et al. | 713/300 |
| 6,629,248 B1 | 9/2003 | Stachura et al. | 719/340 |
| 6,674,271 B2 | 1/2004 | Choo et al. | 323/282 |
| 6,701,443 B1 | 3/2004 | Bell | 713/300 |
| 6,874,093 B2 | 3/2005 | Bell | 713/300 |
| 6,952,785 B1 | 10/2005 | Diab et al. | 713/300 |
| 7,081,827 B2 * | 7/2006 | Addy | 340/693.2 |
| 7,155,622 B2 * | 12/2006 | Mancey et al. | 713/324 |
| 7,203,849 B2 * | 4/2007 | Dove | 713/300 |
| 7,337,336 B2 * | 2/2008 | Ferentz et al. | 713/300 |
| 2003/0135766 A1 | 7/2003 | Syskowski et al. | 713/300 |
| 2004/0025066 A1 | 2/2004 | Jackson et al. | 713/300 |
| 2005/0243861 A1 * | 11/2005 | Elkayam et al. | 370/466 |
| 2005/0262364 A1 | 11/2005 | Diab et al. | 713/300 |
| 2005/0272402 A1 * | 12/2005 | Ferentz et al. | 455/402 |
| 2005/0283627 A1 | 12/2005 | Diab et al. | 713/300 |
| 2006/0053324 A1 * | 3/2006 | Giat et al. | 713/300 |
| 2006/0063509 A1 * | 3/2006 | Pincu et al. | 455/402 |
| 2006/0100799 A1 * | 5/2006 | Karam | 702/57 |
| 2006/0133368 A1 * | 6/2006 | Tolliver | 370/389 |
| 2006/0149978 A1 * | 7/2006 | Randall et al. | 713/300 |
| 2006/0164108 A1 * | 7/2006 | Herbold | 324/691 |

FOREIGN PATENT DOCUMENTS

| | | | |
|---|---|---|---|
| GB | 2 034 055 A | 5/1980 | |
| JP | 200214964 A | 8/2000 | |

OTHER PUBLICATIONS

International Search Report for PCT/US2005/013365, Search completed Aug. 17, 2005, 3 pages.

* cited by examiner

US 7,478,251 B1

METHODS AND APPARATUS FOR PROVISIONING UNINTERRUPTIBLE POWER FOR POWER OVER ETHERNET APPLICATIONS

BACKGROUND

A typical Power over Ethernet (PoE) power communications system includes power-sourcing communications equipment (PSE) and a set of remotely-powered network devices (e.g., PDs or Powered Devices) that connect to the power-sourcing communications equipment through network cables. Power-sourcing communications equipment can include i) power supply circuitry to provide power through a cable to a respective network device and ii) transmit/receive circuitry to support data communications with a respective network device at the other end of a cable. Accordingly, when supplied power through the cable, a user of the respective network device is not burdened with having to separately connect his network devices to another power source such as a 115 volt wall outlet. Instead, the network device coupled to a port of the power-sourcing communications equipment relies on power received through the cable.

There are industry standards which attempt to provide guidelines for manufacturing certain types of power-sourcing communications equipment. For example, the IEEE 802.3af standard, which is also called the "Power over Ethernet" standard, defines ways to build Ethernet power-sourcing equipment and powered devices. In particular, the IEEE 802.3af standard identifies ways to deliver certain electrical features (e.g., 48 volts) of DC power over unshielded twisted-pair wiring (e.g., Category 3, 5, 5e or 6 network cables, patch cables, patch-panels, outlets and connecting hardware) to a variety of Ethernet devices such as IP phones, wireless LAN access points, laptop computers, web cameras, etc.

In the context of the IEEE 802.3 Ethernet Standard, which does not cover UPS applications and is limited to PSE and PD interactions, the power-sourcing communications equipment discussed above is referred to a Power Sourcing Equipment (PSE) and network devices coupling to the PSE (e.g., a switch device) through cables are known as Powered Devices (PDs).

According to one conventional technique, a PSE receives power from a power source such as an Uninterruptible Power Supply (UPS) that produces power based on primary power and, when needed, backup power. When the primary power (e.g., 115 or 230 volts or a DC voltage) fails due to a power outage, the power source relies on the backup power (e.g., power from capacitors, batteries, generator, etc.) to provide continued and uninterrupted power to the PSE. Preferably, the power source can transition to a use of the backup power so quickly that there is no interruption of power provided from the power source to the PSE. Consequently, the PSE can provide continuous power through cables to the associated PDs even during a power outage. Accordingly, some VOIP phone systems, wireless PD devices (such as 802.11 base stations) and other PDs include a central switch configured to provide power through cables to the end devices (e.g., PDs such as VOIP phones, 802.11 base stations etc.) thus alleviating the need for PDs that require power under all circumstances (uninterrupted power) to have separate individual power supplies.

SUMMARY

There are deficiencies associated with conventional approaches to delivering uninterrupted power from a PSE to remotely-powered devices. These deficiencies can be divided into two broad categories: (a) inability to do power allocation and PD prioritization during a power failure, and (b) difficulty in managing the UPS/PSE resources in a network. Specific examples of each area are given below.

(a) Inability to do Power Allocation and PD Prioritization During a Power Failure As discussed above, a PSE can continue to operate while operating on backup power provided by an uninterruptible power supply. However, today's network devices now demand more power over respective Ethernet cables thus increasing backup power requirements of the PSE and corresponding uninterruptible power supply. Actual power demand on these power supplies associated with a PSE are significantly larger than a "data" only network due to the additional aggregate port load and power that has to be supported. Demanding more power during a backup mode increases the cost of the backup power resources (e.g., batteries, rack size utilized) that must be purchased and installed to provide the PSE (and therefore the PDs) backup power during a power outage. In many cases, personnel implementing the PSE overcommit to providing uninterrupted power to the PDs during a power outage because of their failure to appreciate the limitations associated with a corresponding backup power supply and its ability to provide power during a primary power failure. Without providing enough backup power resources to a UPS and therefore the PSE, the PDs coupled to the PSE will not be provided appropriate backup power during a power outage. Consequently, a PD may not operate during an emergency when it is most needed and expected to work. That is, a PD such as a VOIP (Voice Over Internet Protocol) telephone device may not work as a result of burdening the PSE and UPS during a power failure. This deters people from transitioning to use of VOIP phones in lieu of traditional phone systems, the latter of which typically continue to operate even during a power outage.

(b) Difficulty in Managing the UPS/PSE Resources in a Network

Traditional management of the UPS and PD resources is rudimentary at best, leaving additional deficiencies in the power-over-Ethernet end-to-end system. For instance, a network administrator may easily misconnect a UPS system to the wrong PSE system leaving a huge number of PDs, such as VoIP phones and wireless base stations, lacking essential power backup. Traditional management techniques would rely on manual checks at the aggregate system level, so for the problem described, the situation may not be detected. Moreover, an even more difficult problem to detect is an incorrectly sized UPS system connected to a PSE system that would require substantially more output from the UPS to cover all of its PDs in the case of a power failure.

These deficiencies described with regards to conventional systems in conjunction with increased power demand of PDs vs. data only networks result in (a) poor integration of UPS and PSE causing an inability to provide end to end services, (b) higher equipment costs such commonly referred to as capital expenditures (e.g., buying additional upfront equipment like more batteries to deal with peak power demand from all devices rather than critical devices) and (c) higher operating costs commonly referred to as operating expenditures (e.g., ongoing costs associated with maintaining and managing the equipment and system over its life due to poor UPS/PSE management), and (d) lack of services vs. traditional data-only or non-UPS PoE systems (such as UPS profile mobility, prioritization, notification etc.). To solve these and other deficiencies, it is desirable to provide a mechanism enabling devices to share UPS-related information for smarter provisioning of backup power when main power is lost.

PROPOSED EMBODIMENTS

In general, an electronic system (e.g., an IP phone system) of the present application utilizes improved UPS-related communications for enhanced power provisioning control and flexibility in the event of power loss from a main power source. Such UPS-related communications endow the system with additional data for smarter provisioning of power during the power loss. Here are several example embodiments that address the various deficiencies outlined above.

Addressing the first deficiency (a), for example, once a central VoIP switch is made aware that the main power as been lost and the system is on backup power, the switch can better allocate/prioritize power remaining in the UPS to different power devices (e.g., IP phones). Such improved UPS-related communications results in smarter power management particularly when there is very little power remaining in the UPS.

Addressing the second deficiency (b), for example, in response to loss of the main power source, an UPS is capable of sending a central VoIP switch a signal notifying the switch that power from the main power source has been lost.

As another example, addressing the second deficiency outlined above (b) the switch is capable of placing further emphasis on upstream communications with the UPS such as querying the UPS for an actual amount of remaining power at any particular time. Thus, if a particular PSE is unconnected from its UPS or misconnected to a UPS that cannot provide the correct power, the PSE will find out about the condition and notify the end user.

There are two broad embodiments of the invention including A.) prioritization of powering PDs during a power failure, and B.) enhanced Switch-UPS communications.

A) First Embodiment

Prioritization of Powering PDs

More particularly, in contrast to the above-described conventional approaches to implementing power-sourcing communications equipment, a first embodiment of the invention is directed to techniques for provisioning power to ports of a PSE based on an identified priority of providing power to PDs coupled to the ports during a power failure. For example, a PSE such as a switch system has configuration information identifying a priority of providing power to the PDs during a power failure condition in which the PSE runs on backup power. For instance, in the VoIP example, the ports on the PSE connected to emergency phones would have the highest priority, ports connected to the VPs' phones may have the second highest priority class and all other phones would have the lowest priority. Based on the identified priority, the PSE selectively provides power to the ports and therefore the PDs during a power failure mode. Such techniques enable smart provisioning of power from the PSE to the PDs, reducing an unnecessary draw on backup power during a power out condition and enabling backup of certain PDs that have a higher associated priority over lower priority devices. Consequently, existing battery power backup systems need not be expanded. Instead, the PSE provisions power according to a priority. This prioritization allows for over-subscription of UPS properties without an added capital expenditure for larger battery backup supplies. Similarly, one can extend the life of critical PDs over others based on de-powering the PDs during a power failure according to prioritization.

Accordingly, in a general sense, the first embodiment of the invention, addressing deficiency (a) described above, is directed to techniques for provisioning power from a PSE such as a switch as further discussed below. For example, an apparatus such as a switch includes ports configured to provide power and data to remote network devices (e.g., PDs) through a set of cables. A controller in PSE controls how to provision power through the ports to the network devices over the cables. For example, according to one embodiment, the controller of the PSE receives a signal indicating a transition of powering the PSE from a primary power input to a backup power supply. The backup power may be limited as to its ability of providing backup power to the PSE. In response to receiving the signal, the controller utilizes a current configuration of the network to identify a priority of providing backup power through ports of the power sourcing equipment. Based on the identified priority based on use of a powering algorithm, the controller selectively provides power through the ports to respective network devices. That is, the PSE provides some network devices power while denying power to others. Consequently, the PSE and, more specifically, the controller enables rationing of power from the PSE depending on priority level associated with network devices coupled the switch system as well as the powering/de-powering algorithm used by the controller. This technique of load management reduces a number of batteries required by a UPS (Uninterruptible Power Supply) to maintain power to respective PDs.

The powering/de-powering algorithm allows the controller to determine which PDs to de-power and how long to keep the PDs it wants to power up. For example, the algorithm determines how to provision power depending on factors such as the capacity available/remaining from the backup power supply, the priority classification of the PDs attached to the PSE, the number of PDs in each priority class, and a service level that the network administrator may want to impose on one or all of the priority classes.

B) Second Embodiment

Enhanced Switch-UPS Communications

At a high level, a second embodiment of the present application is directed to enhanced communication between the switch and the UPS for the purpose of uninterruptable power delivery for a PoE application. Communication can be done in several ways. For instance, one way involves modulating the information over the actual power feed (whether it be an AC or DC power feed into the PSE from the UPS). Another method involves use of Ethernet packets over a data link between the PSE and UPS. Yet another method involves use of a low level bit-based communication scheme such as a serial or parallel interface between the UPS and the PSE.

There are yet further deficiencies associated with conventional communication systems. For example, conventional applications provide poor integration of PSEs and corresponding UPSs providing power. This results in an inability to provide end to end services. In view of this deficiency, a second embodiment of the invention is directed towards providing better integration between a switch device and a corresponding UPS. As described earlier, an end-to-end PoE system includes a PSE (e.g., a switch), a power source, PD(s), a PD/PSE link and a power source/PSE link. The PSE provides power and data over a network (e.g., cables, etc.) to multiple network devices. The power source provides power to the PSE. The PD/PSE link (e.g., a data link in which power is delivered when a PSE discovers a PD) couples the PD to the PSE. The power source/PSE link couples the power source to the PSE and includes a power signal to convey power from the power source to the PSE.

In one example embodiment, to support communications with the PSE, the power source modulates a data signal onto the power signal to convey information to the PSE. This reduces a number of cables coupling the power source to the PSE because the power signal and data signal are combined into a common conductor.

Also, this technique is fail-safe since a cable technician won't forget to connect an extra communication cable because there is only one instead of two. Perhaps an overarching advantage of this technique is that the management of the UPS becomes automated and centralized with the other network management functions, which as we discussed in the deficiencies helps reduce the operational costs but more importantly eliminates a misconnection between the UPS and PSE, querying the UPS about its state etc. Again, this technique affords for more automation of the whole process. For example, enhanced communications between the PSE and UPS allows the PSE to query the UPS rather than have the information manually inputted by a user to the PSE. This method also enables the UPS to be queried and controlled based on the intelligence in the PSE.

Alternately, in another example to support communications with the PSE, the power source conveys information and receives instruction from the PSE by a link separate from the power signal. While this may not reduce the number of cables, it may support other advantages such as higher rates of data communication between the UPS and the PSE. In this example, enhanced communications between the PSE and UPS allowing the PSE to query the UPS rather than have the information manually inputted by a user to the PSE is also feasible.

In furtherance of this second embodiment, and under both methods of communication, a PSE provides power and data over a network to multiple network devices. A power source provides power to the power sourcing equipment. Based on a link coupling the power source and the PSE, the PSE transmits one or more messages over the link to control or query the power source. A message from the PSE to the power source can include a command for the power source to discontinue providing power to the power sourcing equipment or alternatively it can interrogate the power source for its status including battery life, capacity, identification information, etc. Providing enhanced integration between a UPS and PSE reduces operational expenditure costs (it is more OpEx rather than CapEx as it is mainly due to management) and also addresses typical manageability issues associated with the UPS.

In summary, techniques discussed herein provide a way for a PSE (e.g., a switch) to monitor a corresponding UPS (e.g., a power source providing power to the PSE) and control the UPS based on smart provisioning of power such as gracefully powering down devices (e.g., PDs) powered by the PSE based on capacity of the UPS. The latter embodiments are directed towards providing a closer integration between a switch and a UPS. The initial embodiments are directed towards prioritizing backup power based on a classification of the PDs attached to it during the power failure as well as the powering/depowering algorithm employed by the PSE's controller.

Techniques of the present application are well suited for use in VOIP systems. However, it should be noted that embodiments of the present application are not limited to use in such applications and can be used in wireless hub applications, digital web camera applications, etc. or any other PD/PSE systems employing Power over Ethernet (PoE) systems.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Among other embodiments, one embodiment of the invention is directed to techniques for provisioning power to ports of a switch based on an identified priority of providing power to PDs coupled to the ports and an associated powering/depowering algorithm. For example, a PSE such as a switch system receives configuration information detailing a backup power priority classification of its associated PDs with respect to providing power to the PDs during a power failure condition in which the PSE runs on backup power. Based on an identified priority to be applied while in a backup mode and a powering/de-powering algorithm, the PSE selectively provides power to the ports having higher associated priority PDs. Such techniques enable "smart" provisioning of power from the PSE to the PDs, reducing an unnecessary draw on backup power during a power out condition. Thus, costs associated with resources providing backup power to the PSE can be reduced because the PSE selectively provides power to fewer devices during a power failure. As will be discussed, additional embodiments of the invention provide for better integration between a PSE and a UPS.

Figure 1:
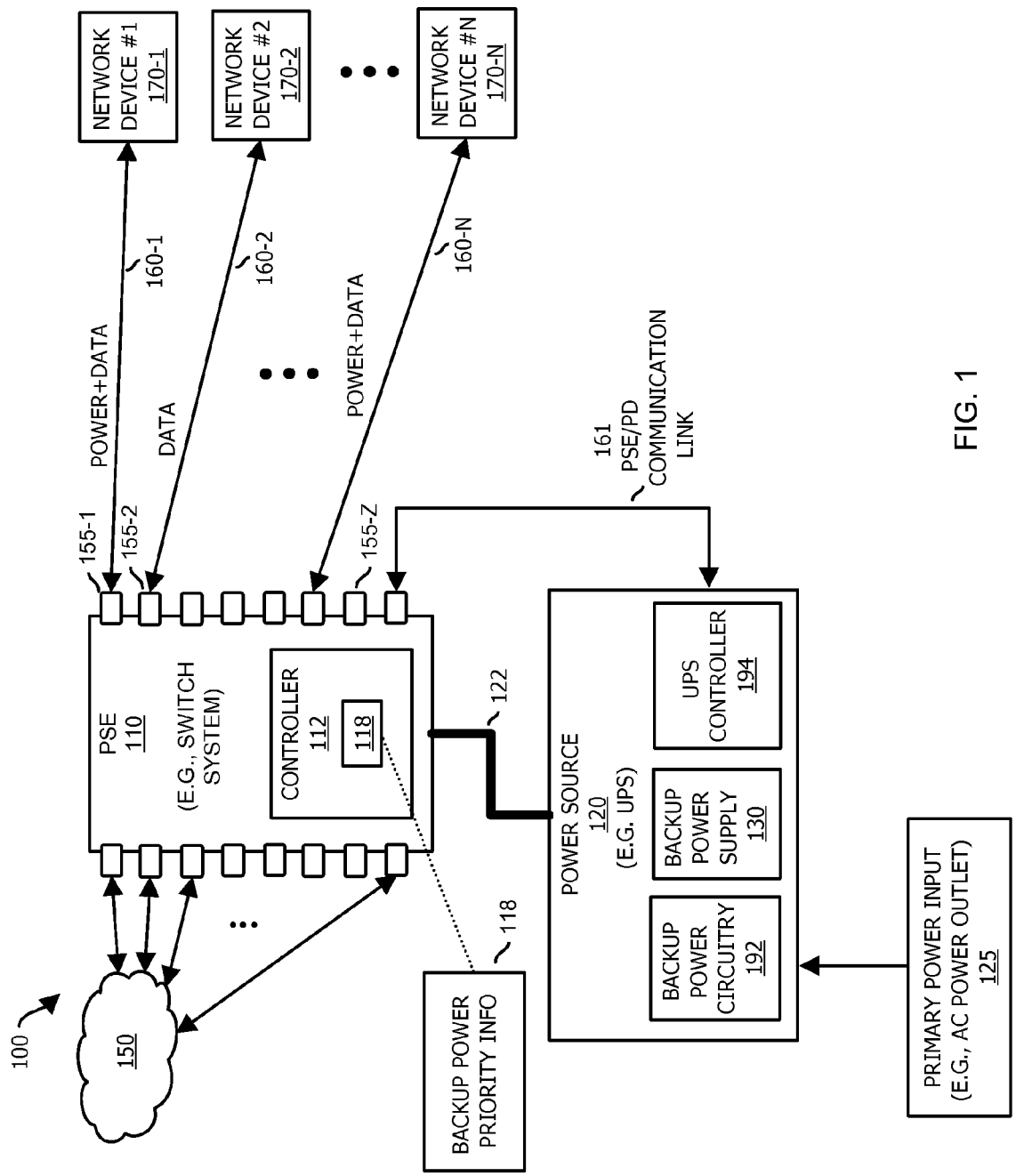
FIG. 1 is a block diagram of a communication system utilizing a backup power priority system according to an embodiment of the invention.

FIG. 1 is a block diagram of an end-to-end Power over Ethernet (PoE) communication system 100 utilizing backup power priority information 118 according to an embodiment of the invention. As shown, communication system includes network 150, power sourcing equipment 110, network device 170-1, network device 170-2, ..., network device 170-n (collectively network devices 170, some of which may be PDs that receive power from the PSE, others are simply non-PoE network elements such as devices that do not receive power from the power sourcing equipment 110), power source 120, receiving power from the primary power input 125, and the power source's backup power supply 130. Power sourcing equipment 110, such as a switch, includes port 155-1, port 155-2, ..., port 155-z (collectively ports 155), and controller 112 that stores backup power priority information 118. Link 160-1, link 160-2, ..., link 160-n (collectively links 160), couple or connect ports 155 of power sourcing equipment 110 to network devices 170. Power source includes UPS controller 194 to control functions of power supply 130, backup power source 130 to provide backup power during a power failure, and backup power circuitry 192 to support generation of power signal 122 to PSE 110.

There are two broad mechanisms for providing improved provisioning of backup power including techniques of A.) prioritizing power to ports (and thus PDs) during a power failure, and B.) providing enhanced PSE-UPS communications. In the context of FIG. 1, the first technique involves selectively providing power through ports 155 depending on a priority of providing power to network devices 170. The second technique involves utilizing PSE/PD communications PSE/PD communication link 161 and/or power feed 122 to provide enhanced communications between PSE 110 and power source 120. Each of these techniques is discussed in more detail below. Note that certain embodiments of the invention overlap with each other. Thus, each of the sections below may include references to the other embodiments.

A. Provisioning Power to Ports of PSE During a Power Failure

In general, power sourcing equipment 110 such as a switch device, a router device, etc. enables network devices 170 to communicate through respective ports 155 to networks 150. In one embodiment, power sourcing equipment 110 supports data communications such as TCP/IP and Ethernet communications. Note that as shown in FIG. 1, not all network devices 170 receive power and data from PSE 110. For example, network device 170-2 does not receive power from PSE 110 but network device 170-2 does receive and transmit data over link 160-2.

Power source 120 provides power (e.g., uninterruptible power) to power sourcing equipment 110 via power signal 122. During normal conditions, power source 120 generates power signal 122 based on power received from primary power input 125. During a power failure when primary power input 125 (e.g., a 230 volt line) fails, power source 120 utilizes power from its backup power supply 130 (e.g., a limited battery backup source) to generate power signal 122. In one embodiment, transitioning from use of primary power input 125 to backup power supply 130 occurs so quickly that power supplied through power signal 122 is continuous. In other words, power sourcing equipment 110 receives continuous power from power source 120 regardless of whether a power outage occurs on primary power input 125.

In addition to providing data communications to network devices 170, power sourcing equipment 110 provides power to certain ports 155 as well. During a failure on primary power input 125, power source 120 notifies controller of the condition such as through a communication on PSE/PD communication link 161. In turn, controller 112 utilizes backup power priority information 118 to selectively continue to provide power to network devices 170 during the power failure. In general, backup power priority information 118 identifies a priority of providing power from the power sourcing equipment 110 to the network devices 170 during a power failure mode when power source 120 generates power signal 122 based on backup power supply 130. This technique is further discussed with respect to FIG. 2.

Figure 2:
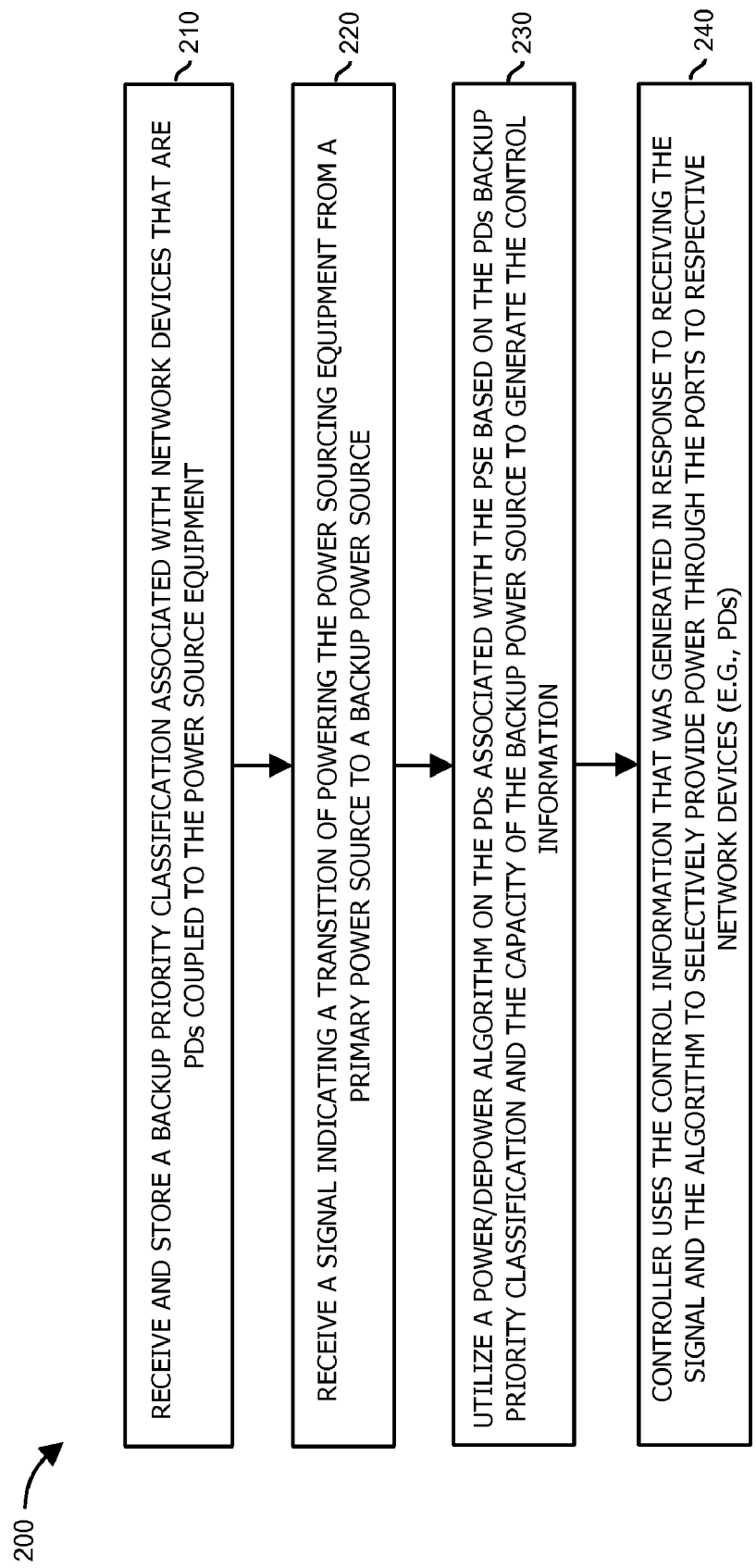
FIG. 2 is a flowchart depicting a method of prioritizing power distribution to ports of a PSE according to an embodiment of the invention.

FIG. 2 is a flowchart 200 depicting a method of prioritizing power distribution to ports 155 of a power sourcing equipment 110 according to an embodiment of the invention.

In step 210, controller 112 receives and stores (e.g., from a network administrator) power backup priority information 118 (e.g., backup priority classification information) associated with network devices 170 coupled to the power sourcing equipment 110 as one of its PDs.

In step 220, the controller 112 receives a signal (e.g., a message) on PSE/PD communication link 161 from power source 120. The message indicates a transition of powering the power sourcing equipment 110 from a power source 120 relying on primary power input 125 to a backup power supply 130 (e.g., a battery backup source, generator, etc.).

Figure 4:
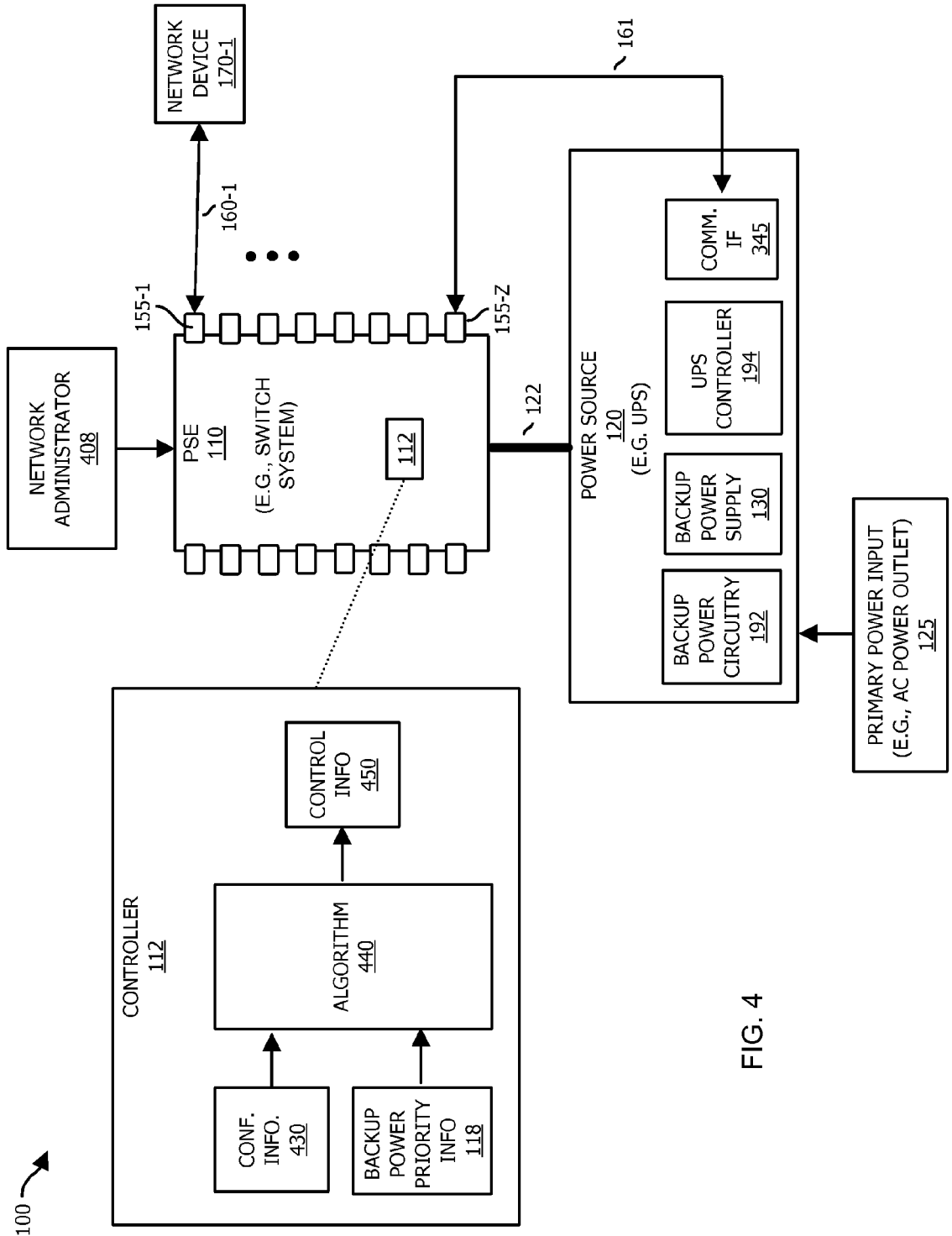
FIG. 4 is a diagram illustrating generation of backup power control information under PD the prioritization system according to an embodiment of the invention.

In step 230, the controller 112 uses a powering/de-powering algorithm 440 (as shown in FIG. 4) on the associated PDs based on the capacity of the backup power supply 125 and the backup power priority information 118 to generate the control information 450.

In step 240, in response to receiving the notification, and based on the algorithm computation performed in the previous step, the controller 112 selectively provides power through the ports 155 to respective network devices 170 to provision power (during the primary power input 125 failure).

Based on use of the backup power priority information 118 and the powering/de-powering algorithm, the controller 112 can gracefully power down or discontinue providing power to the network devices 170 to prevent the power source 120 from attempting to provide more backup power than it reasonably should provide during a failure of the primary power input 125. In other words, if the PSE 110 provides continuous power to every network device 170 during a power failure, the PSE 110 will more quickly drain power source 120. For example, a backup power supply 130 may last for 10 minutes when PSE 110 powers 10 PDs. The same backup power may last only 1 minute when PSE 110 powers 100 PDs. Selectively reducing power from PSE 110 to the network devices 170 enables the power sourcing equipment 110 to extend the amount of time that the power sourcing equipment 110 can provide power to network devices 170 having a higher associated priority such as a network telephone device, president's computer, smoke detectors, badge readers, security cameras, etc. that must work during a power outage. Lower priority network devices 170 may include flat panel displays, non-essential phones, laptop trickle chargers, etc. that are not provided power from the PSE 110 when primary power input 125 fails.

Figure 3:
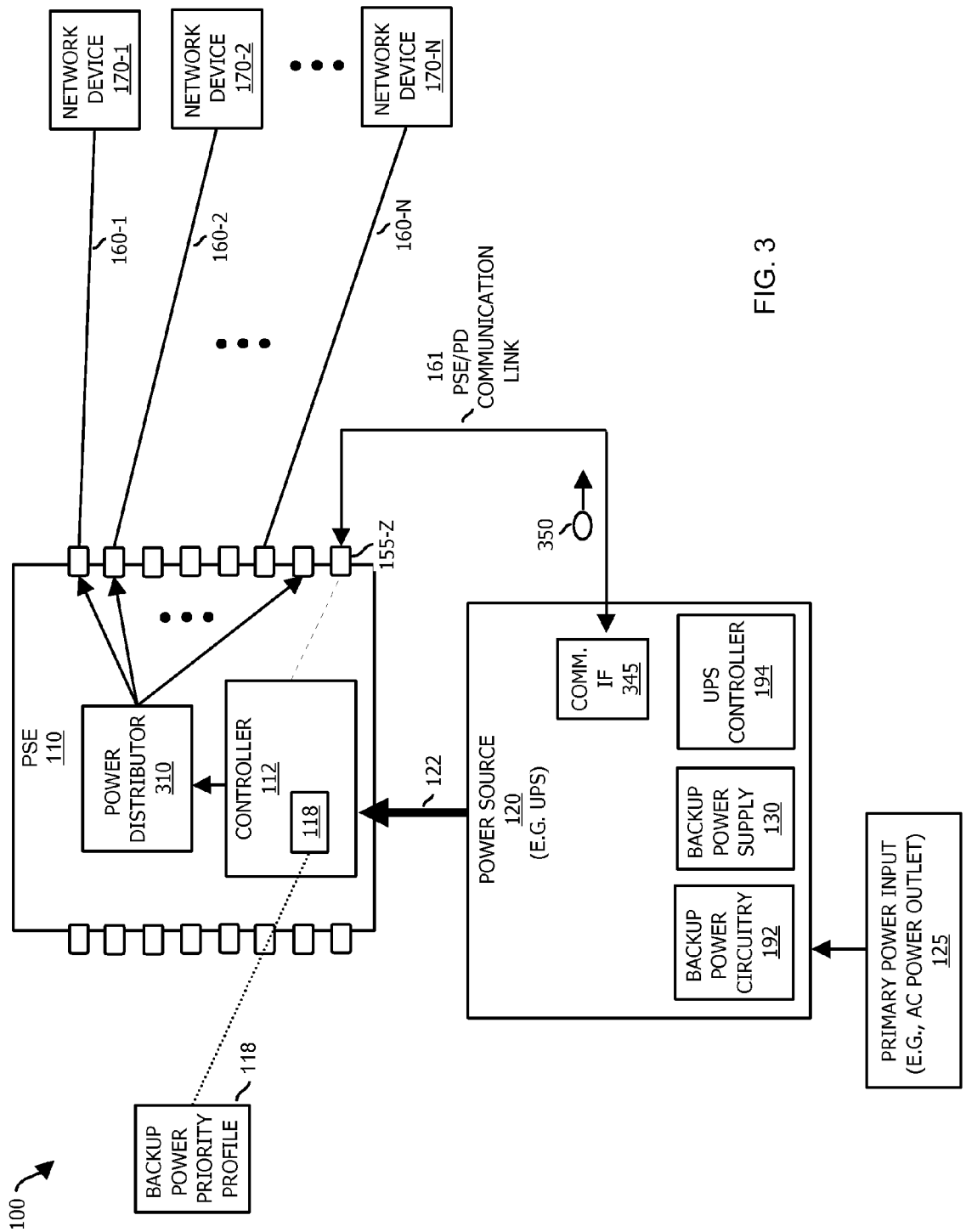
FIG. 3 is a detailed block diagram of a PSE and corresponding power source according to an embodiment of the invention.

FIG. 3 is a detailed block diagram of power sourcing equipment 110 and corresponding power source 120 according to an embodiment of the invention. As shown, in addition to elements discussed with respect to FIG. 1, power sourcing equipment 110 in FIG. 3 illustrates a power distributor 310 coupled to controller 112. The power distributor 310 receives commands from controller 112 indicating which ports 155 to provide power through links 160 (e.g., Ethernet cables) and thus network devices (PDs) 170 during a power failure. FIG. 3 additionally illustrates that power source 120 includes a communication interface 345 for communicating over PSE/PD communication link 161.

Power source 120 includes backup power circuitry 192 (e.g., a switching power supply) that generates power signal 122 to power sourcing equipment 110 based on use of primary power input 125 and, during a power outage, backup power supply 130. Power source 120 includes a controller 194 that supports communication with controller 112 via respective PSE/PD communication link 161 and port 155 of power sourcing equipment 110.

In one embodiment, PSE/PD communication link 161 supports communications between power sourcing equipment 110 and power source 120 allowing for a better integration between, for example, a switch device and an UPS. One application of PSE/PD communication link 161 involves use of an Ethernet based protocol such as SNMP (Simple Network Management Protocol) or CDP (Cisco Discovery Protocol) to support communication between the power sourcing equipment 110 and power source 120 so that the power sourcing equipment 110 can read the status of the power source 120 and control its features. In this case, PSE/PD communication link 161 is a conductor or set of conductors physically separated from a conductor used to convey power signal 122 from power source 120 to PSE 110.

Alternately, a simple serial protocol can be used that is conveyed over the actual power cable such that PSE/PD communication link 161 is no longer needed. This eliminates the use of respective port 155 on power sourcing equipment 110. More specifically, one embodiment includes modulating the actual AC or DC power signal 122 to include a communication signal from the power source 120. Thus, in this embodiment, functional attributes (i.e., the ability to support communications) of PSE/PD communication link 161 become physically superimposed on signal 122. This again eliminates the need to use respective port 155 on power sourcing equipment 110, while still providing the capability of communicating between communication interface 345 and controller 112. Moreover, this embodiment eliminates the need for yet another cable (e.g., PSE/PD communication link 161) and makes use of a single conductor set to convey power and communications between the power source and PSE 110.

In one embodiment, power sourcing equipment 110 monitors power source 120 to identify whether power source 120 has the ability to provide the appropriate energy to power sourcing equipment 110. In the event that the power sourcing equipment 110 identifies that the power source 120 cannot provide proper power or there is a mismatch with respect to power sourcing equipment 110, the power sourcing equipment 110 broadcasts a notification message over network 150 to notify a network administrator of the condition. Also, power sourcing equipment 110 can transmit messages to a selected number of users at network devices 170 via an appropriate notification message or windows pop-up alert. In addition to monitoring for a mismatch (e.g., when a battery backup unit is connected to power source 120, but does not have the ability to provide backup as required by a PSE 110) of a backup power supply 130 and power source 120, power sourcing equipment 110 can monitor power source 120 to identify a status of power source 120, primary power input 125, and backup power supply 130. For example, power sourcing equipment 110 can inquire about a capacity of backup power supply 130 to provide power during a power outage.

Power source 120 also can monitor a status of primary power input 125 and backup power supply 130. During a power failure on primary power input 125, power source 120 generates and transmits message 350 through communication interface 345 to controller 112 of power sourcing equipment 110. In the alternative, power sourcing equipment 110 polls power source 120 regarding a power status and whether power source 120 presently relies on power from backup power supply 130 to generate power signal 122. As discussed, controller 112 selectively provides power to the network devices 170 based on backup power priority information 118. FIG. 4 illustrates origination and generation of the backup power priority information 118 in more detail.

Use of Priority Information to Selectively Provide Power to Network Devices

FIG. 4 is a diagram illustrating generation of backup power priority information 118 and a general distribution of information according to an embodiment of the invention. As shown, communication system 100 includes network 150, power sourcing equipment 110, network device 170-1, power source 120, primary power input 125, and backup power supply 130. Power sourcing equipment 110 includes controller 112 that stores backup power priority information 118 and configuration information 430.

The power sourcing equipment 110 has the ability to classify the individual network devices 170 (e.g., PDs) into several classes based on their respective backup requirements. For instance, a non-critical phone may be given a lowest class priority rating while an emergency IP phone may be given a highest class priority rating. Based on classification of the network devices 170 and the status of the power source 120, the power sourcing equipment 110 and its controller 112 utilize control information 450 generated by powering/de-powering algorithm 440 to gracefully power down network devices 170 to keep critical devices up and avoid a brown out event. Algorithm 440 generates control information 450 based on configuration information 430 and backup power priority information 118 provided by network administrator 408.

Class information in conjunction with a power condition can be used to prolong the backup time of specific ports 155 of the power sourcing equipment 110 according to a pre-defined powering/de-powering algorithm. For instance, the highest and second highest classes can be respectively assigned different backup life times (for instance 8 hours of backup for the highest priority vs. 5 hours of backup for the second highest priority) so that during a power failure condition, when power source 120 provides power sourcing equipment 110 power based on backup power supply 130, ports 155 of the power sourcing equipment 110 can be turned off in priority order if the primary power input 125 does not come back up. The classification information (e.g., backup power priority information 118) may be entered by the system administrator 408 on the console associated with PSE 110 or via a remote computer that communicates with PSE 110 over a network.

For example, in one application, network administrator 408 enters configuration information 430 including a mapping of which network devices 170 are coupled to which ports 155-1 of power sourcing equipment 110. One purpose of providing configuration information 430 is to inform power sourcing equipment 110 which network devices 170 are coupled to which respective ports 155 so that power sourcing equipment 110 can selectively provide power during a backup power mode in which primary power input 125 fails.

After the configuration information 430 and the backup classification information 118 are inputted by the network administrator 408 and received by the controller 112, the controller runs a powering/de-powering algorithm 440 on this information as well as the capacity of the backup power supply 130 that it previously received over PSE/PD communication link 161 to generate the backup power control information 450.

The control information 450 is then used to selectively power network devices 170 connected to the PSE 110.

Figure 5:
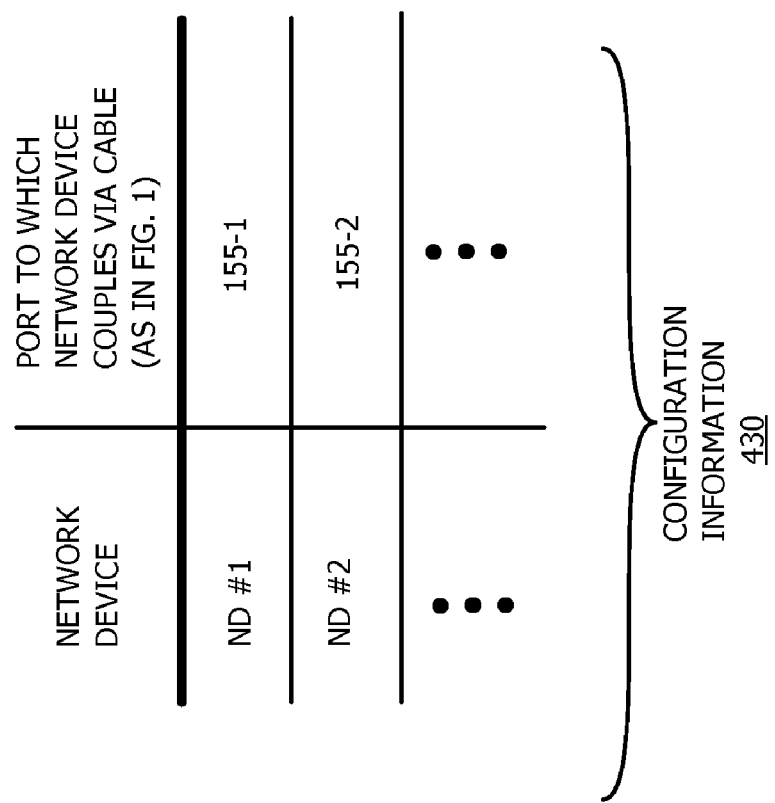
FIG. 5 is a diagram of configuration information according to an embodiment of the invention.

FIG. 5 is a diagram of configuration information 430 according to an embodiment of the invention. As shown, configuration information 430 identifies a corresponding network device 170 and a port 155 to which the network device 170 is coupled via a respective link 160. For example, as shown in FIG. 1 and as identified by configuration information 430, network device 170-1 (i.e., ND #1) couples through link 160-1 to port 155-1 of power sourcing equipment 110; network device 170-2 (i.e., ND #2) couples through link 160-2 to port 155-2 of power sourcing equipment 110; and so on. As mentioned, power sourcing equipment 110 and, more specifically, controller 112 utilizes the configuration information 430 received from network administrator 408 to identify which network devices 170 are connected to ports 155 of power sourcing equipment 110

In addition to entering configuration information 430 as discussed, network administrator 408 also enters backup power priority information 118. In general, backup power priority information 118 (e.g., a mobile priority profile) identifies power backup requirements associated with the network devices 170 coupled to ports 155 of the power sourcing equipment 110.

In other embodiments, a network administrator 408 assigns specific network devices 170 or types of network devices 170 to different priority classes for being provided continued power during power failure mode such as a failure of primary power 125. In either case, the backup power priority information 118 exists prior to the failure.

Figure 6:
FIG. 6 is a diagram of backup power allocation and control information under the priority classification and algorithm system according to an embodiment of the invention.

FIG. 6 is an example diagram of control information 450 generated by algorithm 440 according to an embodiment of the invention. As shown, control information 450 includes a list of network devices 170 (or a user) and corresponding power data and control information to be used and applied during a power failure mode. For example, network device 170-1 (i.e., ND #1) has a priority class rating of 2, a backup power time of 1 hour, and power consumption requirements of 150 watts; network device 170-2 (i.e., ND #2) has a priority class rating of 1, a backup power time of 5 hours, and power consumption requirements of 30 watts; network device 170-3 (i.e., ND #3) has a priority class rating of 5, a backup power time of 5 minutes, and power consumption requirements of 220 watts; and so on. Priority class 1 network devices 170 are afforded higher priority than priority class 2 network devices 170; priority class 2 network devices 170 are afforded higher priority than priority class 3 network devices 170; and so on. Note that the specifications in backup power control information 450 associated with a respective network device 170 is merely an example of possible information to be associated with a network device 170 and such a list can include other types of power specification information as well.

Referring again to FIG. 4, network administrator 408 provides the backup power priority information 118 to power sourcing equipment 110. Thus, power sourcing equipment 110 receives backup power priority information 118 associated with network devices 170. Depending on the embodiment, backup power priority information 118 includes a list of network devices 170 potentially coupled to ports 155 of the power sourcing equipment 110 or a list of network devices 170 currently coupled to ports 155 of the power sourcing equipment 110. The power sourcing equipment 110 and more specifically the controller 112 utilizes the backup power priority information 118 (e.g., power backup profile) to identify an associated priority of providing backup power to network devices 170 coupled to respective ports 155 of the power sourcing equipment 110. For example, in one embodiment, controller 112 identifies network devices 170 or users associated with a given port 155 of power sourcing equipment 110 based on configuration information 430.

As discussed, controller 112 utilizes backup power control information 450 to identify a priority class associated with providing continued power to the ports 155 during a power failure. Thus, communication system 100 includes a classification of network devices 170 according to a set of different priority levels. In one application, for classes of network devices 170 associated with the different priority levels, the power sourcing equipment 110 discontinues providing power to the classes of network devices 170 depending on how long the power sourcing equipment 110 has been relying on use of a backup power from the backup power supply 130 to provide power from power source 120 to PSE 110.

Providing Backup Power for at Least a Short Duration to all Network Devices

The use of the powering/de-powering algorithm 440 affords the system extreme flexibility in utilizing the available but limited backup power supply. Below are several examples illustrating the advantage.

In one embodiment, power sourcing equipment 110 provides at least a short duration of continuous power to all respectively powered network devices 170 after a power failure. For example, power sourcing equipment 110 provides power to all network devices 170 for a duration of several minutes with hopes that primary power input 125 will be revived, which would relinquish the need to selectively discontinue applying power to the network devices 170 as discussed.

Prior to powering down lower priority network devices 170, the power sourcing equipment 110 can initiate notification to a user of a lower priority network device or the network device 170 itself that the power sourcing equipment 110 is presently running on the backup power supply 125 and that the lower priority network device 170 will eventually no longer be provided power through a respective port 155 of the power sourcing equipment 110. Consequently, a user of the network device 170 can be proactive and save data to storage before losing power provided by the power sourcing equipment 110. Accordingly, after transitioning over to backup power supply 130 and running on backup power supply 125 for some time, power sourcing equipment 110 provides continued power to ports 155 of the power sourcing equipment 110 for a duration of time before selectively discontinuing distribution of power to lower priority ports of the power sourcing equipment 110 in favor of higher priority ports.

B. Enhanced Integration of PSE and UPS

Learning of an Occurrence of a Power Failure

Power sourcing equipment 110 can learn of a power failure mode in a number of ways. For example, in one embodiment, power sourcing equipment 110 receives a data signal modulated onto a power signal 122 provided by power source 120 to power the power sourcing equipment 110. Modulation of a data signal onto the power signal 122 enables power source 120 to notify power sourcing equipment 110 that power source 120 is presently running on backup power supply 130. Use of the modulated signal eliminates the need for PSE/PD communication link 161 and network interface card in power source 120, and opens up a respective port 155 of power sourcing equipment 110 to be used for communicating with another potential network device 170. Accordingly, one embodiment of the invention includes: i) power sourcing equipment 110 that provides power and data over a link (e.g., a network) to multiple network devices 170; ii) a power source 120 that provides power to the power sourcing equipment 110; and iii) a link or cable of one or multiple conductors coupling the power source 120 to the power sourcing equipment 110. Thus, the power signal 122 conveys power from the power source 120 to the power sourcing equipment 110 as well data information (e.g., a status of the power source 120 or backup power resources, occurrence of events, etc.) to the power sourcing equipment 110.

In another embodiment, the power sourcing equipment 110 learns of a power failure mode via the communication PSE/PD communication link 161 between the PSE and power source 120.

In response to a power failure condition, power sourcing equipment 110 can generate a command to bring another initially unused backup resource (as part of backup power supply 130) on-line so that the power sourcing equipment 110 can provide an additional duration of uninterrupted power through a power outage.

Identifying an Amount of Available Backup Power

When in a power backup mode, backup power supply 130 (e.g., battery backup resources) typically can supply only a limited amount of power to power source 120. In one embodiment, power sourcing equipment 110 generates a query to power source 120 to learn how much energy is available from the backup power supply. In response to the query, the power sourcing equipment 110 receives a message from the power source 120 indicating a level of available energy from the backup power supply 125. Thereafter, power sourcing equipment 130 selectively discontinues providing power to the network devices 170 depending on the amount of energy available from the backup power supply 130, the power backup information 118 and the algorithm 440. In other words, the power sourcing equipment 110 can communicate with power source 120 to learn of a status of available power and make appropriate decisions on how to provide further power to the network devices 170.

In another embodiment, based on a duration of providing power to respective network devices during a power failure mode, the power sourcing equipment 110 calculates, according to algorithm 440, how much power or energy is available from the backup power supply 130 supplying power to the power sourcing equipment 110 based on, for example, how long the power sourcing equipment 110 has provided power during the power failure mode. Based on the calculated available energy in the backup power supply 130, the power sourcing equipment 110 selectively discontinues providing power to the respective network devices 170.

In yet another embodiment, the power sourcing equipment 110 generates an estimate of backup power required to provide power to the network devices 170 during a power failure. For example, the power sourcing equipment 110 receives a backup power priority information 118 associated with network devices 170 capable of being coupled to and powered through ports 155 associated with the power sourcing equipment 110. As discussed, the backup power priority information 118 indicates power backup settings associated with the network devices to be applied during a power failure. Based on the backup power priority information 118 and network devices 170 currently powered through the ports 155, the power sourcing equipment 110 generates an estimate of backup power required to provide power to the network devices 170 during a power failure. The power sourcing equipment 110 forwards the estimate to power source 120 (e.g., power source) that provides power to the power sourcing equipment 110. Consequently, power source 120 can be informed of expected load conditions during a power failure.

The power source 120 can then determine whether or not (based on available backup resources) the power source 120 will be able to provide such power during a power failure mode. If not, the power source 120 notifies power sourcing equipment 110 that it will be able or unable to provide such backup. Accordingly, one embodiment of the invention includes a "proactive" power source 120 that determines, based on calculations such as an amount of overall power required by the network devices 170 as specified in the backup power priority information 118, whether the power source 120 will be able to provide appropriate power in the event of a failure. Thus, an administrator of the communication system 100 can be automatically informed of whether a backup resource such as backup power supply 130 can provide enough power during a failure on a primary power input 125.

CONCLUSION

Conventional power backup systems do not provide network administrators with flexibility because they are only presented with an option of scaling the power source 120 to the worst case power consumption condition for power backup. This can be extremely costly over "data only" type switch systems. As discussed, customers do not always understand the worst case power draw and can blindly oversubscribe a power source 120.

The above techniques solve these issues by: i) reducing an overall cost of a communication system by allowing selective backup of ports 155; ii) allowing the monitoring of the power source 120 and allowing the communication system 100 to gracefully react to power conditions, (for instance, during a power failure, ports 155 can be selectively turned off to maintain a certain number of hours based on class, effectively prolonging the life of the UPS battery for those critical ports); iii) protecting a user customer and providing a user friendly method of understanding the issue of over subscribing (e.g., providing more power to PDs than the power source 120 reasonably should during a power failure) a UPS, effectively preventing sudden and undesirable brownouts; and iv) providing a solution that allows selective backup of ports without the need to use mid-span devices (in line power injectors).

Accordingly, by way of example, a typical power source 120 (e.g., UPS) that provides 5 KVA (KiloVolt Amperes) for 2 hours costs about $25,000. This cost can be reduced to about $15~20 k based on use of a load shedding feature discussed herein. This represents a network node cost savings of approximately 10-25% per switch/UPS pair.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In power sourcing equipment that manages distribution of power and data over a network, a method comprising:
  receiving a signal from a power source, the signal indicating a transition of the power source switching from a primary power input to a backup power supply to provide continuous power to the power sourcing equipment during a failure on the primary power input;
  utilizing a current configuration of the network to identify a priority of providing backup power through ports of the power sourcing equipment;
  in response to receiving the signal, selectively providing power through the ports to respective network devices to provision power depending on the identified priority;
  receiving configuration information that identifies network devices currently coupled to ports of the power sourcing equipment;
  receiving power backup information associated with network devices potentially coupled to the power sourcing equipment; and utilizing a powering/de-powering algorithm to process the configuration information and the power backup information to identify an associated priority of providing backup power to the network devices coupled to respective ports of the power sourcing equipment.

2. A method as in claim 1 further comprising:
from the power sourcing equipment, initiating notification to a user associated with a lower priority network device that the power sourcing equipment is running on the backup power supply and that the lower priority network device will eventually no longer be provided power through a respective port of the power sourcing equipment.

3. A method as in claim 1, wherein receiving the signal further includes receiving the signal as a modulated signal onto a power signal provided by the power source that provides power to the power sourcing equipment.

4. A method as in claim 1, wherein receiving the signal results from the power sourcing equipment communicating with the power source via at least one of a serial communication link and a packet-based communication link that is separate from a power signal generated by the power source to provide power to the power sourcing equipment.

5. A method as in claim 1, wherein selectively providing power through the ports includes:
after receiving the signal indicating a transition over to the backup power supply, providing continued power to ports of the power sourcing equipment for a duration of time before selectively discontinuing distribution of power to lower priority ports of the power sourcing equipment in favor of higher priority ports.

6. A method as in claim 1 further comprising:
generating a query to the power source to identify how much energy is available from the backup power supply;
in response to the query, receiving a message indicating a level of available energy from the backup power supply; and
selectively discontinuing providing power to the network devices coupled to ports of the power sourcing equipment depending on the energy available from the backup power supply.

7. A method as in claim 1 further comprising:
based on communications from the power sourcing equipment to the power source, identifying that the power sourcing equipment is misconnected to the power source such that the power source cannot provide correct power to the power sourcing equipment during a power failure.

8. A method as in claim 1 further comprising:
based on a duration of previously providing power to the respective network devices, calculating how much energy is available from the backup power supply supplying power to the power source to provide power to the power sourcing equipment; and
selectively discontinuing providing power to the respective network devices depending on the calculated energy available from the backup power supply.

9. A method as in claim 1 further comprising:
classifying the network devices according to a set of different priority levels; and
for classes of network devices associated with the different priority levels, discontinuing providing power to the classes of network devices depending on how long the power sourcing equipment has been receiving backup power from the backup power supply.

10. A system comprising:
power sourcing equipment that provides power and data over a network to multiple network devices;
a power source that provides power to the power sourcing equipment; and
a link coupling the power source to the power sourcing equipment, the link including a power signal to convey power from the power source to the power sourcing equipment, the power source modulating a data signal onto the power signal to convey data to the power sourcing equipment;
wherein the power sourcing equipment is configured to (i) receive configuration information that identifies network devices currently coupled to ports of the power sourcing equipment, (ii) receive power backup information associated with network devices potentially coupled to the power sourcing equipment, and (iii) utilize a powering/de-powering algorithm to process the configuration information and the power backup information to identify an associated priority of providing backup power to the network devices coupled to respective ports of the power sourcing equipment.

11. A system as in claim 10, wherein the power source reports an occurrence of events associated with the power source to the power sourcing equipment via the data signal.

12. A system comprising:
power sourcing equipment that provides power and data over a network to multiple network devices;
a power source that provides power to the power sourcing equipment; and
a link coupling the power source to the power sourcing equipment, the power sourcing equipment transmitting a message over the link to control the power source;
wherein the power sourcing equipment is configured to (i) receive configuration information that identifies network devices currently coupled to ports of the power sourcing equipment, (ii) receive power backup information associated with network devices potentially coupled to the power sourcing equipment, and (iii) utilize a powering/de-powering algorithm to process the configuration information and the power backup information to identify an associated priority of providing backup power to the network devices coupled to respective ports of the power sourcing equipment.

13. A system as in claim 12, wherein the message includes a command for the power source to discontinue providing power to the power sourcing equipment.

14. In power sourcing equipment that manages distribution of power and data over a network, a method comprising:
receiving a power backup profile associated with multiple network devices capable of being coupled to and powered through ports associated with the power sourcing equipment, the power backup profile indicating power backup settings to be applied to corresponding network devices during a power failure;
identifying network devices currently being powered through ports associated with the power sourcing equipment;
based on the power backup profile and network devices currently powered through the ports, generating an estimate of backup power required to provide power to the network devices during a power failure; and
forwarding the estimate to a power source that provides power to the power sourcing equipment.

15. An apparatus for provisioning power over a network, the apparatus comprising:
power sourcing equipment that manages distribution of power and data over a network to a set of network devices, ports of the power sourcing equipment being connected to the network devices through respective cables;
a controller associated with the ports of the power sourcing equipment, the controller being configured to:
receive a signal from a power source providing power to the power sourcing equipment, the signal indicating a transition of the power source switching from a primary power input to a backup power supply to provide continuous power to the power sourcing equipment during a failure on the primary power input;
utilize an algorithm to identify a priority of providing backup power through the ports of the power sourcing equipment;
selectively provide power through the ports to respective network devices to provision power depending on the identified priority in response to receiving the signal and identifying the priority of providing backup power;
receive configuration information that identifies network devices currently coupled to ports of the power sourcing equipment;
receive power backup information associated with network devices potentially coupled to the power sourcing equipment; and
utilize the algorithm to process the configuration information and the power backup information to identify an associated priority of providing backup power to the network devices coupled to respective ports of the power sourcing equipment.

16. An apparatus as in claim 15, wherein the controller is further configured to:
receive backup power information associated with network devices potentially coupled to the power sourcing equipment; and
utilize the algorithm to process the backup power information associated with the network devices and identify an associated priority of providing backup power to network devices coupled to respective ports of the power sourcing equipment.

17. An apparatus as in claim 15, where in the controller is further configured to:
initiate notification to a user associated with a lower priority network device that the power sourcing equipment is running on the backup power supply and that the lower priority network device will eventually no longer be provided power through a respective port of the power sourcing equipment.

18. An apparatus as in claim 15, where in the controller is further configured to:
generate a query to a power source providing backup power from the backup power supply to identify how much energy is available from the backup power supply;
in response to the query, receive a message indicating a level of available energy from the backup power supply; and
selectively discontinue providing power to the network devices coupled to ports of the power sourcing equipment depending on the energy available from the backup power supply.

19. An apparatus as in claim 15, where in the controller is further configured to:
utilizing the algorithm to classify the network devices according to a set of different priority levels; and
for classes of network devices associated with the different priority levels, discontinue providing power to the classes of network devices depending on how long the power sourcing equipment has been receiving backup power from the backup power supply.

20. An apparatus for provisioning power over a network, the apparatus comprising:
power sourcing equipment that manages distribution of power and data over a network to a set of network devices, ports of the power sourcing equipment being connected to the network devices through respective cables;
a controller associated with the ports of the power sourcing equipment, the controller including:
means for receiving a signal indicating a transition of powering the power sourcing equipment from a primary power input to a backup power supply;
means for utilizing an algorithm to identify a priority of providing backup power through ports of the power sourcing equipment;
means for selectively providing power through the ports to respective network devices to provision power depending on the identified priority; and
wherein means for utilizing an algorithm to identify a priority includes: (i) means for receiving configuration information that identifies network devices currently coupled to ports of the power sourcing equipment, (ii) means for receiving power backup information associated with network devices potentially coupled to the power sourcing equipment, and (iii) means for utilizing a powering/de-powering algorithm to process the configuration information and the power backup information to identify an associated priority of providing backup power to the network devices coupled to respective ports of the power sourcing equipment.

21. In power sourcing equipment that manages distribution of power and data over a network, a method comprising:
receiving a signal from a power source, the signal indicating a transition of the power source switching from a primary power input to a backup power supply to provide continuous power to the power sourcing equipment during a failure on the primary power input;
utilizing a current configuration of the network to identify a priority of providing backup power through ports of the power sourcing equipment, wherein utilizing a current configuration of the network comprises:
receiving configuration information that identifies network devices currently coupled to ports of the power sourcing equipment,
receiving power backup information associated with network devices potentially coupled to the power sourcing equipment, and
utilizing a powering/de-powering algorithm to process the configuration information and the power backup information to identify an associated priority of providing backup power to the network devices coupled to respective ports of the power sourcing equipment; and
in response to receiving the signal, selectively providing power through the ports to respective network devices to provision power depending on the identified priority.

22. A method as in claim 1, wherein:
utilizing a powering/de-powering algorithm includes:
applying a function to operands including:
(a) a current power capacity of the backup power supply,
(b) the configuration information, and
(c) the power backup information, the function generating a control information table to indicate, for each device currently coupled to ports of the power sourcing equipment:
(i) a priority class rating,
(ii) a backup power time, and
(iii) a power consumption requirement; and
selectively providing power through the ports to respective network devices is based on the control information table as calculated.

23. An apparatus as in claim 15, wherein:
utilizing the algorithm to process the configuration information and the power backup information includes:
applying a function to operands including:
(a) a current power capacity of the backup power supply,
(b) the configuration information, and
(c) the power backup information,
the function operating to generate a control information table to indicate, for each device currently coupled to ports of the power sourcing equipment:
(i) a priority class rating,
(ii) a backup power time, and
(iii) a power consumption requirement; and
selectively providing power through the ports to respective network devices is based on the control information table as calculated.

24. A method as in claim 21, wherein:
utilizing a powering/de-powering algorithm includes:
applying a function to operands including:
(a) a current power capacity of the backup power supply,
(b) the configuration information, and
(c) the power backup information,
the function generating a control information table to indicate, for each device currently coupled to ports of the power sourcing equipment:
(i) a priority class rating,
(ii) a backup power time, and
(iii) a power consumption requirement; and
selectively providing power through the ports to respective network devices is based on the control information table as calculated.

* * * * *